United States Patent [19]

Harris

[11] 4,016,320
[45] Apr. 5, 1977

[54] SLIT RAW RUBBER ARTICLE

[75] Inventor: Wilbur E. Harris, Indianapolis, Ind.

[73] Assignee: Uniroyal Inc., New York, N.Y.

[22] Filed: Aug. 20, 1970

[21] Appl. No.: 65,673

Related U.S. Application Data

[63] Continuation-in-part of Ser. No. 537,474, March 25, 1966, abandoned.

[52] U.S. Cl. .............................................. 428/131
[51] Int. Cl.² .......................................... B32B 3/10
[58] Field of Search ........... 161/109, 112; 264/145, 264/146, 153, 154; 83/43, 51, 333, 342, 355, 672, 673; 225/4, 5, 33; 221/49; 428/131

[56] References Cited

UNITED STATES PATENTS

| | | | |
|---|---|---|---|
| 791,691 | 6/1905 | Hadaway | 29/193.5 |
| 1,774,538 | 9/1930 | Aegerter | 29/193.5 |
| 2,397,415 | 3/1946 | Ghez et al. | 161/118 |
| 3,032,337 | 5/1962 | Holman | 83/51 |
| 3,503,289 | 3/1970 | Friberg | 83/1 |

Primary Examiner—Marion E. McCamish
Attorney, Agent, or Firm—Norbert P. Holler

[57] ABSTRACT

The processing of uncured rubber or like raw material, which is normally produced, stored and shipped in sheet form but which is to be subjected to a continuous and uniform strip feeding into an extruder, mill or like treating apparatus, is disclosed. For this purpose, there is provided in a sheet of such material a plurality of slits extending across the sheet and spaced from each other longitudinally of the sheet, the slits in an alternating sequence starting at the opposite side edges of the sheet and each terminating short of the respective other side edge of the sheet. When one end portion of the slit sheet is introduced into the bite of the apparatus, the sheet is subjected to a pulling force and separates along the slits into a continuous zig-zag strip. Apparatus for slitting the sheet in the indicated manner is also disclosed.

6 Claims, 4 Drawing Figures

INVENTOR
WILBUR E. HARRIS

BY *Norbert P. Holler*

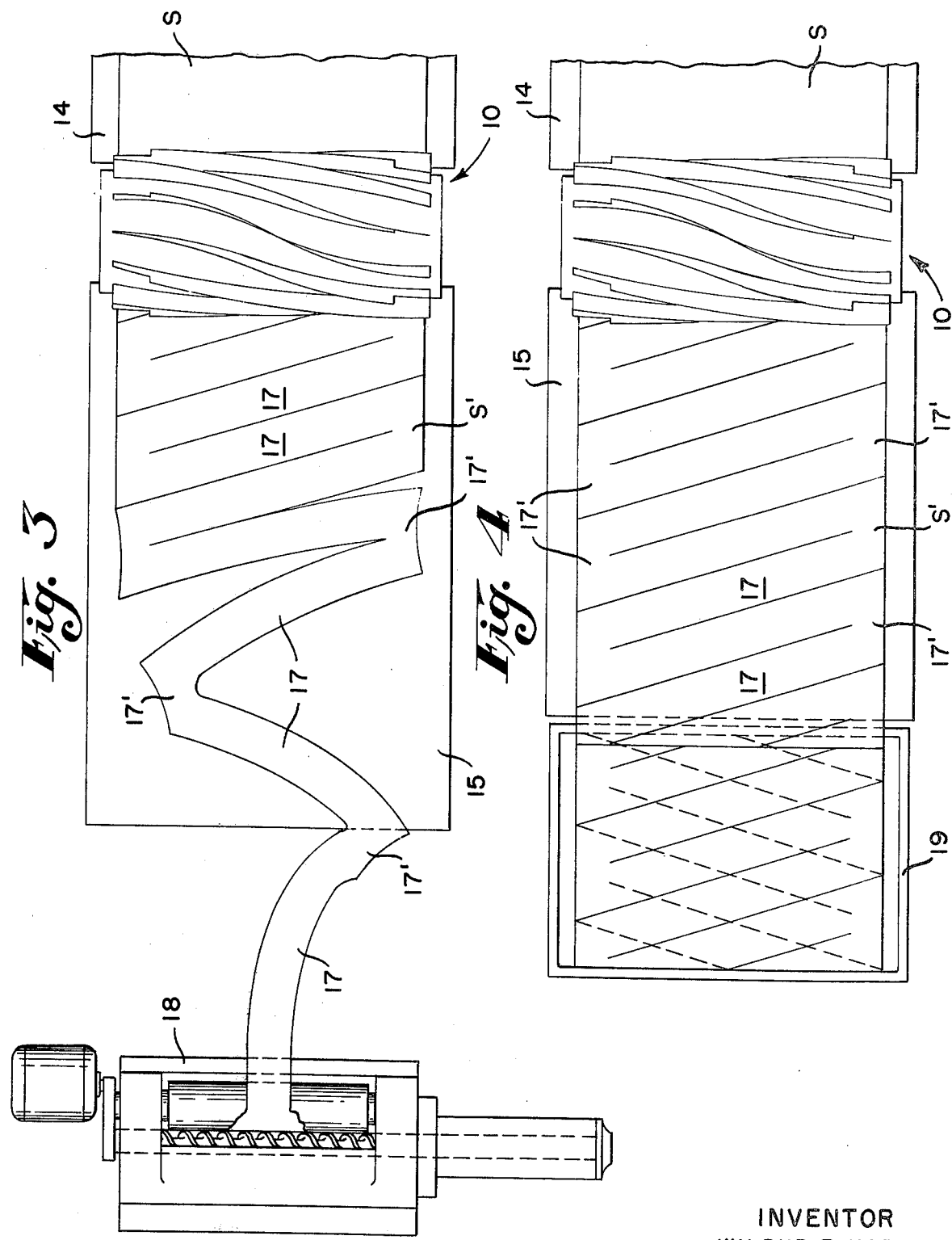

SLIT RAW RUBBER ARTICLE

This application is a continuation in part of my prior copending application Ser. No. 537,474, filed Mar. 25, 1966 and now abandoned.

This abstract is not to be taken either as a complete exposition or as a limitation of the present invention, however, the full nature and extent of the invention being discernible only by reference to and from the entire disclosure.

This invention relates to improvements in the art of processing uncured rubber and like raw materials.

When natural or synthetic uncured rubber stocks or like raw materials are being processed in a mill, extruder or like treating apparatus, they are generally fed into the apparatus in the form of either relatively large irregularly shaped slabs or elongated strips previously formed by suitably cutting up sheets of such material. Whereas the processor of the raw material normally desires to have it in slab or strip form, the producer of such materials, who is usually confronted by a shipping and storage problem, prefers to have the material in sheet form, since neither irregularly shaped slabs nor elongated continuous strips of substantial length can be packaged as compactly and economically as possible, i.e. without an undue waste of space. A further disadvantage encountered is that when such material to be processed is in slab or sheet form, it is difficult to feed it uniformly into the apparatus so as to assure the uniformity of the treatment.

It is an object of the present invention, therefore, to provide novel methods and means of processing uncured rubber or like raw material which enable the aforesaid disadvantages to be substantially eliminated.

A more specific object of the present invention is the provision of novel and improved means and methods enabling the raw material, though produced in the form of relatively wide sheet stock, to be readily transformed into continuous strip stock lending itself to a continuous and uniform feeding into the apparatus.

Generally speaking, the objectives of the present invention are attained by slitting a sheet of such raw material transversely in an alternating sequence in from the opposite side edges of the sheet, each slit terminating short of the respective other side edge of the sheet. When an end portion of such a slit sheet is then introduced into the bite of the apparatus while the same is in operation, the sheet is subjected to a pulling force and separates along the slits into a continuous zig-zag strip.

The foregoing and other objects, characteristics and advantages of the present invention will be more clearly understood from the following detailed description thereof when read in conjunction with the accompanying drawings, in which:

FIGS. 3 and 4 diagrammatically illustrate two ways of utilizing the strip stock formed by the said apparatus.

Figure 1:
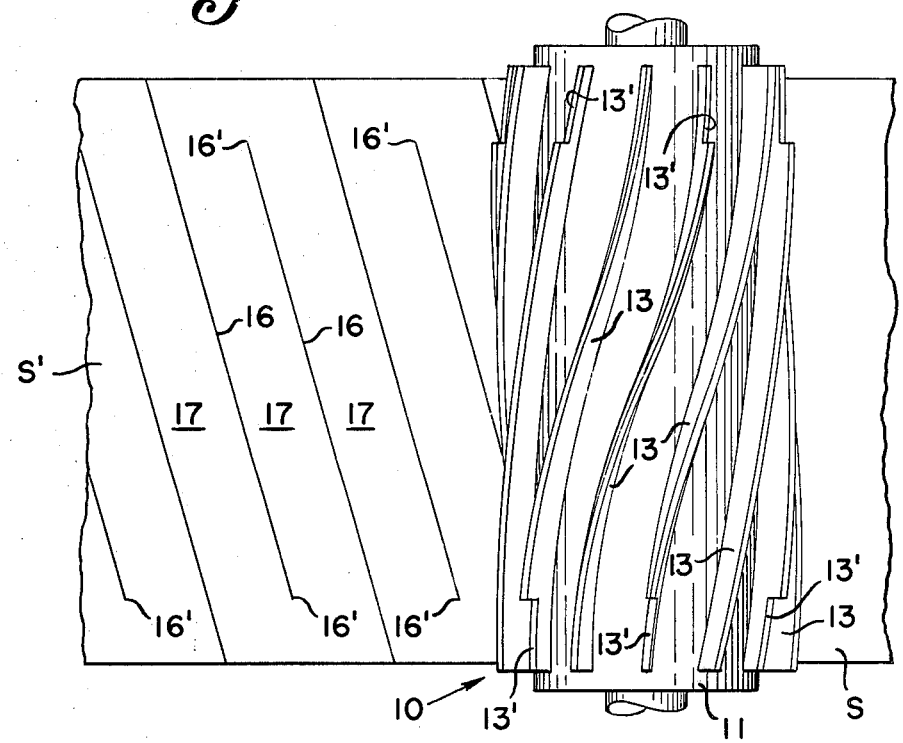
FIG. 1 is a fragmentary top plan view of an apparatus for producing continuous strip stock from a sheet thereof to be processed in accordance with the principles of the present invention.
Figure 2:
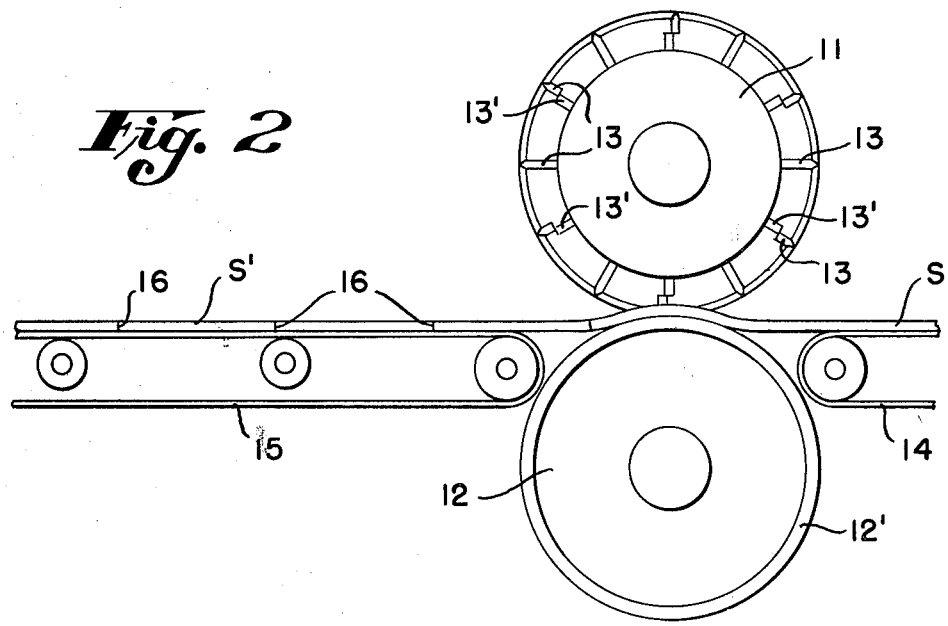
FIG. 2 is a fragmentary side elevational view of the apparatus shown in FIG. 1.

Referring now first to FIGS. 1 and 2, according to the preferred aspects of the present invention the apparatus 10 for cutting sheet stock S of uncured rubber or like raw material into continuous strip stock comprises a rotary cutter 1 driven by any suitable means (not shown) and journalled in parallel cooperative relation to a rotatable backup roll 12. The cutter 11 is provided with a plurality of essentially longitudinally extending, peripherally spaced blades 13 which are shown as being curved in the manner of an ogee. The blades 13, of which there must be an even number, are alternatingly recessed at one end thereof at each end of the cutter, as shown at 13', so that each cutting edge effectively starts at a respective end of the cutter 11 and terminates somewhat short of the respective other end thereof. The two members 11 and 12 are adjustably preloaded toward each other, e.g. by springs or other suitable means (not shown) to permit the sheet stock S passing therebetween to be penetrated to a predetermined extent by the active cutting edge portions of the blades 13. Both the cutter and the back-up roll are preferably made of metal, e.g. stainless steel or the like, with roll 12 further having an outer covering 12' of a suitable elastomeric material, e.g. cast polyurethane.

In the operation of the apparatus 10, the sheet stock S is fed into the bite of the assembly by means of a suitable conveyor arrangement 14 and is there subjected to the cutting action of the blades 13, which at the same time feed it through the nip of the members 11 and 12. It will be readily understood that only the portion of each blade 13 which is not recessed will penetrate into the sheet stock S, and that any portion of the latter which underlies a recessed portion 13' of a given blade will not be cut by that blade. The arrangement may, of course, be so set that the sheet stock S will be entirely cut through, or, for a reason to be explained presently, that the sheet stock will be only partially cut through so as to leave an unpenetrated sheet thickness of, say about 0.003 to 0.004 inch or so. That sheet stock S' which has passed the cutter 11 is transported away by a further suitable conveyor arrangement 15 and is seen to be provided with a plurality of obliquely oriented, parallel, transverse slits 16 extending in an alternating sequence in from the opposite side edges of the sheet and each terminating, as shown at 16', short of the respective other side edge of the sheet. The cut sheet stock S' thus is seen to be composed of a continuous zig-zag strip (see also FIG. 3) in which the connections between adjacent parallel reaches 17 are constituted by the unsevered portions 17' of the sheet.

It will be understood that the present invention can be utilized in a variety of ways. Thus, the apparatus 10 can be more or less intimately associated with an apparatus 18 (FIG. 3), for example an extruder used to extruder tread slabs or strips for tires, so that once the leading end of the strip stock 17 has been fed into the extruder, the pulling force exerted by the latter on the strip automatically opens the sheet stock S' into the desired strip form, thereby ensuring a continuous and uniform admission of stock into the extruder. In such a case, the sheet stock S' may be either fully or partly cut through, as previously described, since even if the latter of these conditions obtains, the unpenetrated sheet thickness in the regions of the slits 16 is insufficient to prevent the sheet sections 17 from being pulled apart into the desired strip form. Quite obviously, the original sheet stock S fed into the apparatus 10 may be fed to the latter either directly from a sheeting mill or the like (not shown) or from a package or bale (not shown) in which it was shipped (in properly "soaped" or stearate-coated condition) to the operator of the extruder. This latter arrangement would be highly advantageous, for example, for a retreader who could feed the sheet stock shipped to him by a rubber producer, first out of the bale right into the cutter assembly and thence directly into the extruder. The foregoing would apply equally well, of course, if the device 18 were a mill or other processing apparatus rather than an extruder.

Alternatively, if the apparatus 10 is located in the plant of a rubber producer, the latter may feed the stearated sheet stock S taken from a mill or other storage facility into the apparatus 10 to form the cut sheet stock S' which then in its unextended form, i.e. merely as slit sheet, may be packaged (FIG. 4) in a standard bale 19 or on a truck for storage and/or shipment. For this purpose it might actually be preferable (although not necessarily essential) that the sheet stock S' be only partly cut through, since this might make it easier to handle the sheet during the baling and unbaling operations. The ultimate user of the strip stock, e.g. a retreader, is then in a position to feed the strip 17 directly from the bale into the extruder, tests having shown that the cut sheet stock S' does not tend to reknit along the slits 16 between adjacent strip reaches 17 during storage and shipment.

It is to be understood that the foregoing description of preferred aspects of the present invention is for purposes of illustration only, and that a number of changes and modifications in the structural and operational features and relationships disclosed may be made without any departure from the spirit and scope of the present invention as defined by the hereto appended claims. Thus, the blades 13 on the cutter 11 need not be ogee-curved as shown but could be linear instead, and obviously the sheet stock may be cut so that the slits 16 extend substantially at right angles to the side edges of the sheet rather than obliquely as shown. Also, the sheet feed may be intermittent and effected by means other than the cutter itself. Other variations will readily suggest themselves to those skilled in the art.

Having thus described my invention, what I claim and desire to protect by Letters Patent is:

1. An article of commerce, comprising a sheet of uncured rubber or like raw material to be fed into an extruder, mill or like treating apparatus, said sheet being provided over the entire length thereof with a plurality of transverse slits spaced from one another longitudinally of said sheet, the slits in an alternating sequence beginning at the opposite side edges of said sheet and each terminating short of the respective other side edge of said sheet, and the arrangement of slits in said sheet enabling the latter, upon one end portion thereof being introduced into the bite of such a treating apparatus and thereby being subjected to a longitudinal pulling force, to separate along the slits into a continuous, relatively narrower, zig-zag strip so as to permit substantially uniform feed of said raw material into the treating apparatus.

2. An article according to claim 1, said slits all being substantially parallel to each other.

3. An article according to claim 1, said slits being oriented obliquely to said side edges of said sheet.

4. An article according to claim 1, said slits being oriented substantially perpendicularly to said side edges of said sheet.

5. An article according to claim 1, said slits extending through the entire thickness of said sheet.

6. An article according to claim 1, said slits extending only partly through the thickness of said sheet, the depth of said slits being such that the unsevered sheet thickness is insufficient to prevent separation of the strip-shaped regions bounded by said slits upon application of the pulling force to said sheet.

* * * * *